(12) United States Patent
Kosmalski et al.

(10) Patent No.: US 10,470,371 B2
(45) Date of Patent: Nov. 12, 2019

(54) HANDLE ACCESSORY TO FACILITATE HEIGHT ADJUSTMENT OF PRECISE HEIGHT MEASURING GAGE FOR A LAWNMOWER BLADE

(71) Applicants: John Kosmalski, Saline, MI (US); Jeffrey Kosmalski, Saline, MI (US)

(72) Inventors: John Kosmalski, Saline, MI (US); Jeffrey Kosmalski, Saline, MI (US)

( * ) Notice: Subject to any disclaimer, the term of this patent is extended or adjusted under 35 U.S.C. 154(b) by 0 days.

(21) Appl. No.: 16/147,075

(22) Filed: Sep. 28, 2018

(65) Prior Publication Data

US 2019/0090426 A1    Mar. 28, 2019

Related U.S. Application Data

(60) Provisional application No. 62/564,717, filed on Sep. 28, 2017.

(51) Int. Cl.
| | | |
|---|---|---|
| *G01B 5/14* | (2006.01) | |
| *A01D 75/00* | (2006.01) | |
| *G01B 3/22* | (2006.01) | |
| *G01B 5/00* | (2006.01) | |
| *A01D 34/00* | (2006.01) | |
| *A01D 101/00* | (2006.01) | |
| *A01D 34/74* | (2006.01) | |

(52) U.S. Cl.
CPC .......... *A01D 75/00* (2013.01); *A01D 34/001* (2013.01); *G01B 3/22* (2013.01); *G01B 5/0025* (2013.01); *G01B 5/14* (2013.01); *A01D 34/74* (2013.01); *A01D 2101/00* (2013.01)

(58) Field of Classification Search
CPC ...................................... A01D 34/54
USPC ................... 33/628, 630, 631, 633
See application file for complete search history.

(56) References Cited

U.S. PATENT DOCUMENTS

| | | | | |
|---|---|---|---|---|
| 2,258,056 | A * | 10/1941 | Hornung | A01D 75/08 33/641 |
| 5,031,335 | A * | 7/1991 | Kimmelman | A01D 34/54 33/613 |
| 5,175,939 | A * | 1/1993 | Wolfram | A01D 34/54 33/412 |
| 5,450,678 | A * | 9/1995 | Check | G01B 3/02 116/200 |
| 6,073,357 | A * | 6/2000 | Kosmalski | A01D 34/54 33/628 |
| 6,470,588 | B1 * | 10/2002 | Pilger | G01B 3/006 33/555.4 |
| 7,392,645 | B1 * | 7/2008 | Elmore | A01D 34/54 33/628 |
| 8,966,777 | B2 * | 3/2015 | Floyd | A01D 34/74 33/286 |
| 2012/0297636 | A1 * | 11/2012 | Floyd | A01D 34/74 33/286 |

* cited by examiner

*Primary Examiner* — George B Bennett

(57) ABSTRACT

A handle accessory includes a handle body, a base plate, and a precise height measuring gage. The handle body and the precise height measuring gage are both positioned on the base plate. The handle body includes a gage reading opening, which allows the user to read the precise height measuring gage without being obstructed by the handle body. The handle accessory facilitates the usage of the precise height measuring gage for the user to set the height of the lawnmower blade.

15 Claims, 4 Drawing Sheets

HANDLE ACCESSORY TO FACILITATE HEIGHT ADJUSTMENT OF PRECISE HEIGHT MEASURING GAGE FOR A LAWNMOWER BLADE

The current application claims a priority to the U.S. Provisional Patent application Ser. No. 62/564,717 filed on Sep. 28, 2017.

FIELD OF THE INVENTION

The present invention generally relates to a handle accessory. More specifically, the present invention is an accessory adding to a base plate of a measuring gage to allow the user to securely holding the measuring gage against a lawnmower blade, so that lawnmower blade adjustments and gage readings can be done at the same time.

BACKGROUND OF THE INVENTION

Maintaining a golf course requires a significant amount of cost and effort. Especially the greens on the golf course requires very accurate grass cutting tool to achieve the requirement of professional golfers. To obtain the proper height of the lawnmower blades, the user needs to use a precise height measuring gage to measure and adjust the height of the lawnmower blades by first disassembling the lawnmower, so that the lawnmower blades are not facing the ground, then place a base plate of the precise height measuring gage on the lawnmower blade for accurate measurement. However, issues arise during the measurement process, because the lawnmower blades may be in a different angle relative to the ground, and the base plate may slip from lawnmower blade and reduce the accuracy of the measurement process. Since the user needs to use one hand to adjust the height of the lawnmower blade and use the other hand to take the measurement, the user can only prevent slippage by having another person or utilizing a separate securing apparatus to press the base plate tightly against the lawnmower blade.

It is an objective of the present invention to provide a handle accessory for the precise height measuring gage. The present invention solves all above issues by providing the handle accessory device that attaches to the base plate of the precise height measuring gage. With the present invention, the user may securely hold the precise height measuring gage against the lawnmower blade without worry about the slippage and can still obtain an accurate reading of the precise height measuring gage by accessing the gage through the opening on the handle. In other words, by incorporating the present invention to the precise height measuring gage, the user can precisely adjust and measure the height of the lawnmower blade simultaneously without worrying the slippage of the base plate.

DETAIL DESCRIPTIONS OF THE INVENTION

All illustrations of the drawings are for the purpose of describing selected versions of the present invention and are not intended to limit the scope of the present invention.

Figure 1:
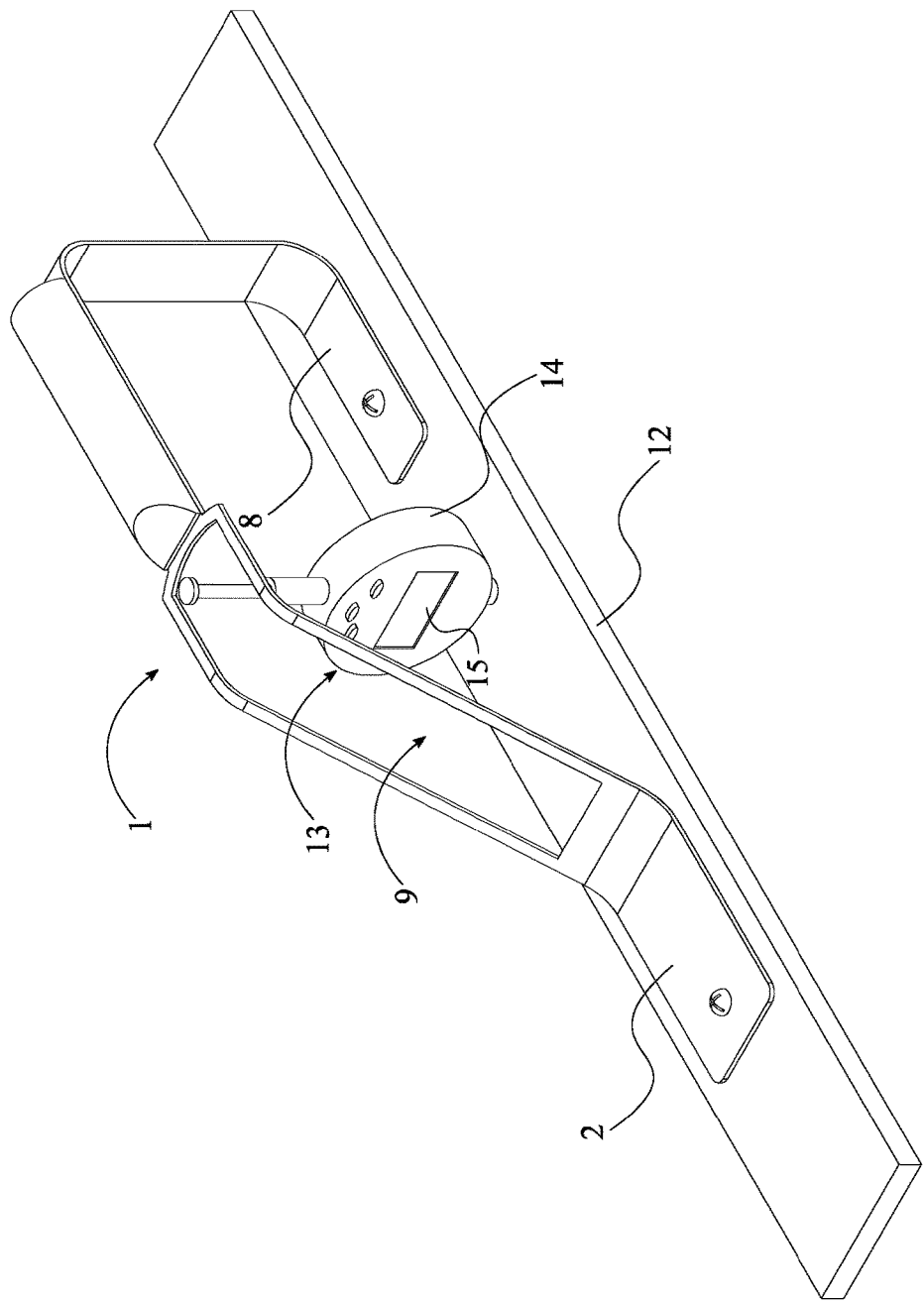
FIG. 1 is a perspective view of the present invention.
Figure 3:
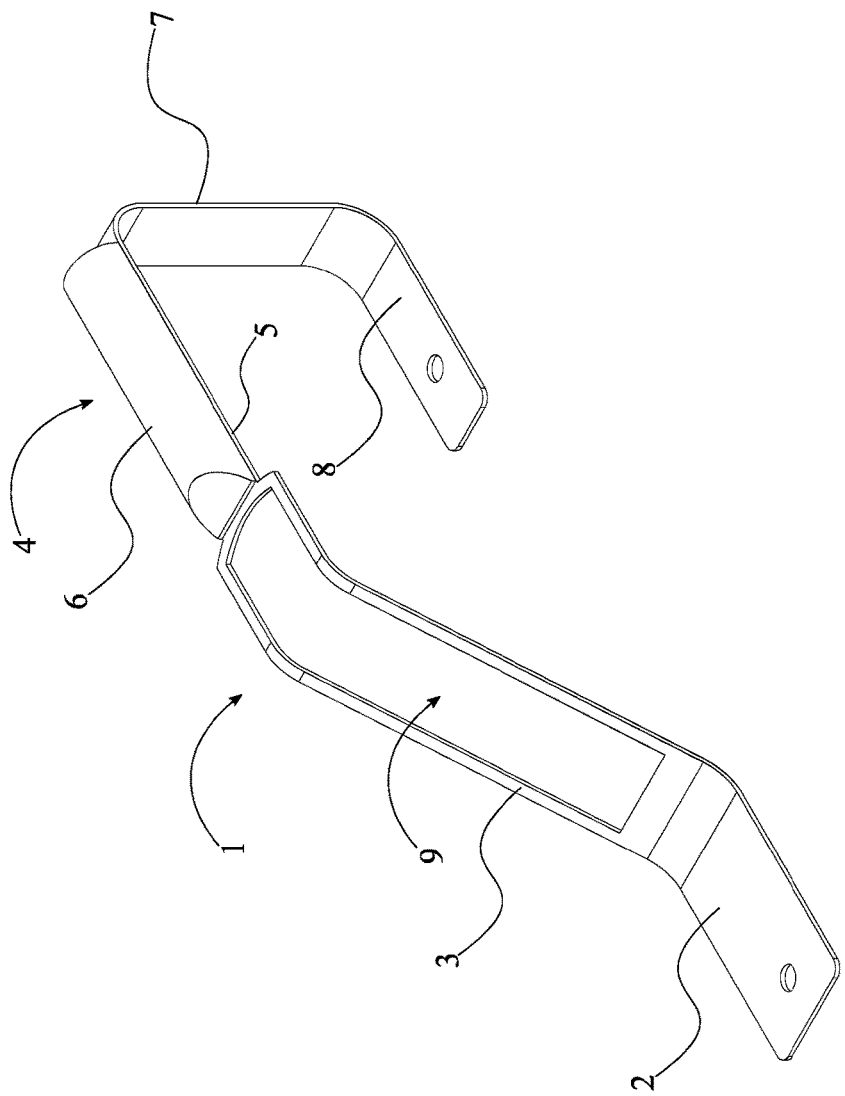
FIG. 3 is a perspective view of the present invention without the base plate and the gage.

In reference to FIGS. 1 and 3, the present invention is a handle accessory to facilitate the user for precisely setting the height of the lawnmower blade. The present invention is configured to allow the user to firmly press a measuring device onto the lawnmower blade, regardless of the lawnmower blade's angle relative to the ground. The user can still operate the measuring device with his thumb while adjusting the height of the lawnmower blade without worrying about slippage or inconsistent measurements as the present invention firmly places the measuring device against the lawnmower blade. The present invention comprises a handle body 1, a base plate 12, and a precise height measuring gage 13. The base plate 12 is rectangular and is configured to mount the handle body 1 and the precise height measuring gage 13. During the measurement of the height of the lawnmower blade, the base plate 12 also provides a reference point for the precise height measuring gage 13.

Figure 2:
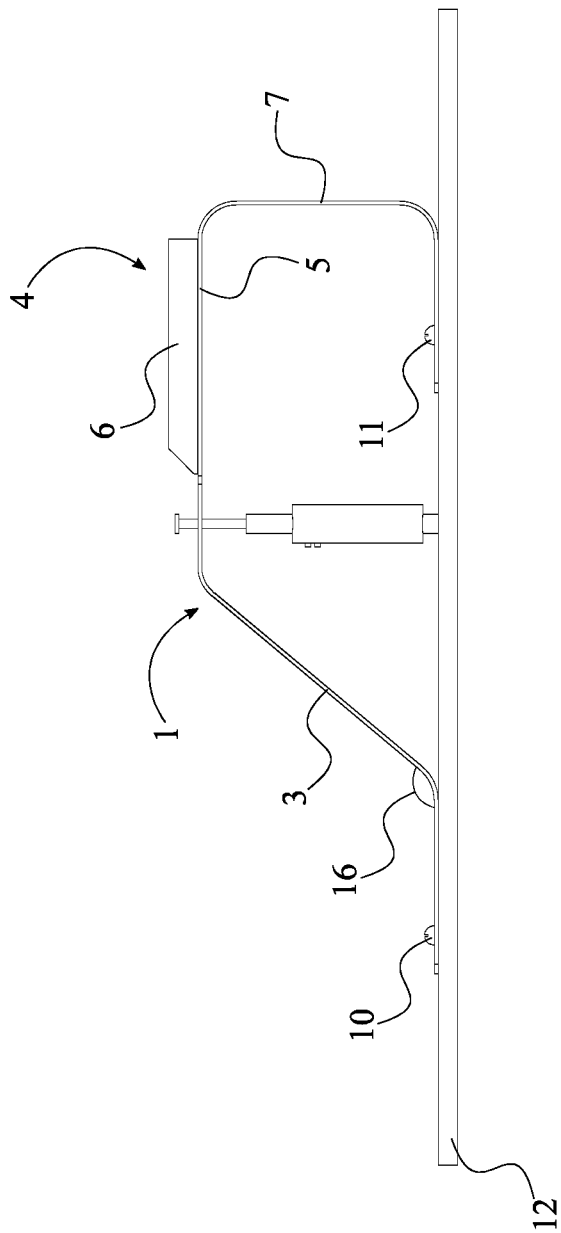
FIG. 2 is a side view of the present invention.
Figure 4:
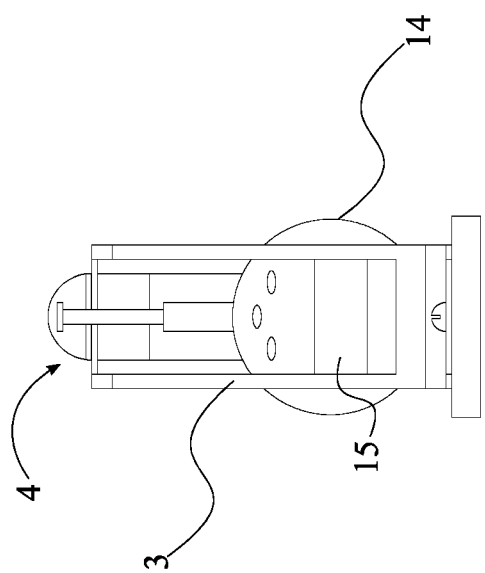
FIG. 4 is a front view of the present invention.

In reference to FIGS. 1, 2, and 4, in a general configuration of the present invention, the handle body 1 comprises a first attachment arm 2, a second attachment arm 8, and a gage reading opening 9. The handle body 1 is terminally attached to the base plate 12 by the first attachment arm 2 and terminally attached to the base plate 12 by the second attachment arm 8, opposite to the first attachment arm 2. The first attachment arm 2 and the second attachment arm 8 are coplanar with each other. In other words, the first attachment arm 2 and the second attachment arm 8 are attached to the same surface on the base plate 12. The first attachment arm 2 is attached to the base plate 12 by a first fastener 10. The first fastener 10 is configured to attach the first attachment arm 2 to the base plate 12. The first fastener 10 may include, but not limited to, a screw, a bolt, or any other related fastening mean. The second attachment arm 8 is attached to the base plate 12 by the second fastener 11. The second fastener 11 is configured to attach the second attachment arm 8 to the base plate 12. The second fastener 11 may include, but not limited to, a screw, a bolt, or any other related fastening mean.

In reference to FIGS. 1 and 2, the precise height measuring gage 13 is positioned between the first attachment arm 2 and the second attachment arm 8 and is configured to provide an accurate measurement of the height of the lawnmower blade. The precise height measuring gage 13 comprises a gage body 14 and a gage display 15. The gage display 15 visually outputs a gage reading of the precise height measuring gage 13 so that the user can be aware of the gage reading. The gage display 15 is oriented toward the first attachment arm 2 through the gage reading opening 9. The gage display 15 is integrated into the gage body 14 and is configured to display the height of the lawnmower blade for the user to make relevant adjustments. The gage body 14 is positioned on the base plate 12, between the first attachment arm 2 and the second attachment arm 8. The gage body 14 is configured to hold all the relevant structures of the precise height measuring gage 13. The precise height measuring gage 13 is configured to provide an accurate measurement the height of the lawnmower blade to $\frac{1}{1000}$ inch. The user operates the precise height measuring gage 13 by pressing the base plate 12 firmly to the lawnmower blade. Then, the precise height measuring gage 13 is accessed to obtain the current height of the lawnmower blade. The height of the lawnmower blade is then adjusted according the required specification and then measured again to confirm. The user may need to repeat this process several times for wider lawnmower blades on the reel lawnmower. Without the present invention, the user has to place the lawnmower blades perpendicularly to a flat surface or parallel to a flat surface to prevent slippage of the base plate 12 to ensure consistent measurement. By combining the present invention to the precise height measuring gage 13, the user may measure and adjust the height of the lawnmower blade simultaneously at any angle without another set of hand to press the base plate 12 firmly to the lawnmower blade while still getting a consistent measurement.

In reference to FIGS. 1 and 2, the handle body 1 further comprises a curved arm 3, a gripping arm 4, and an elongated arm 7. The curved arm 3 is terminally connected to the first attachment arm 2 and angularly positioned in an obtuse angle 16. The curved arm 3 is terminally connected to the gripping arm 4, opposite to the first attachment arm 2. In other words, the curved arm 3 is positioned between the first attachment arm 2 and the gripping arm 4. The gage reading opening 9 traverses through the curved arm 3, between the first attachment arm 2 and the gripping arm 4. The gage reading opening 9 is configured to allow the user to an unobstructed reading and operation of the precise height measuring gage 13 by pressing the thumb through the gage reading opening 9 while adjusting the height of lawnmower blade simultaneously with another hand.

In reference to FIGS. 1 and 2, the gripping arm 4 is terminally connected to the curved arm 3 and positioned opposite to the first attachment arm 2 as the curved arm 3 is linearly positioned to the gripping arm 4. The elongated arm 7 is terminally connected to the gripping arm 4 and positioned opposite to the curved arm 3 as the elongated arm 7 is perpendicularly positioned to the gripping arm 4. In other words, the gripping arm 4 is positioned between the curved arm 3 and the elongated arm 7 and is configured to allow the user to grasp and hold the present invention with one hand while setting the height of the lawnmower blade with the other hand. The gripping arm 4 comprises a base section 5 and a half-cylindrical body 6. The base section 5 is terminally connected to the curved arm 3 and terminally connected to the elongated arm 7 opposite to the curved arm 3. The base section 5 is configured to form a connection between the curved arm 3 and the elongated arm 7. The half-cylindrical body 6 is adjacently attached to the base section 5 and is configured to provide a firm and comfortable grip within the user's palm as the cylindrical shape eliminates sharp corners that may apply strain to user's fingers.

In reference to FIG. 1, the second attachment arm is terminally connected to the elongated arm, opposite to the gripping arm as the second attachment arm is perpendicularly positioned to the elongated arm. In other words, the elongated arm 7 is positioned between the gripping arm 4 and the second attachment arm 8. The elongated arm 7 is configured to form a connection between the gripping arm 4 and the second attachment arm 8. The elongated arm 7 and the curved arm 3 delineate an empty space between the handle body and the base plate so that the user inserts his/her finger around the handle body 1 and may rest the edge of the palm on the elongated arm 7. The elongated arm 7 and the curved arm 3 also provided some space between the first attachment arm 2 and the second attachment arm 8 to mount the precise height measuring gage 13 on the base plate 12.

Although the invention has been explained in relation to its preferred embodiment, it is to be understood that many other possible modifications and variations can be made without departing from the spirit and scope of the invention as hereinafter claimed.

What is claimed is:

1. A handle accessory comprises:
a handle body;
a base plate;
a precise height measuring gage;
the handle body comprises a gage reading opening, a first attachment arm, and a second attachment arm;
the precise height measuring gage further comprises a gage display and a gage body;
the gage display being integrated onto the gage body;
the gage display being oriented toward the first attachment arm through the gage reading opening;
the first attachment arm being terminally attached to the base plate;
the second attachment arm being terminally attached to the base plate, opposite to the first attachment arm; and
the precise height measuring gage is positioned between the first attachment arm and the second attachment arm.

2. The handle as in claim 1 comprises:
the handle body further comprises a curved arm, a gripping arm, and an elongated arm;
the curved arm being terminally connected to the first attachment arm, opposite to the base plate;
the gripping arm being terminally connected to the curved arm, opposite to the first attachment arm;
the elongated arm being terminally connected to the gripping arm, opposite to the curved arm; and
the second attachment arm being terminally connected to the elongated arm, opposite to the gripping arm.

3. The handle as claimed in claim 2 comprises:
the curved arm being angularly positioned to the first attachment arm at an obtuse angle;
the gripping arm being linearly positioned to thee curved arm;
the elongated arm being perpendicularly positioned to the gripping arm; and
the second attachment arm being perpendicularly positioned to the elongated arm.

4. The handle as claimed in claim 2 comprises:
the gripping arm comprises a base section and a half-cylindrical body;
the base section being terminally connected to the curved arm;
the base section being terminally connected to the elongated arm opposite to the curved arm; and
the half-cylindrical body being adjacently connected onto the base section.

5. The handle as in claim 2, wherein the gage reading opening traversing through the curved arm.

6. The handle as claimed in claim 1 comprises:
a first fastener; and
the first attachment arm being terminally attached to the base plate by the first fastener.

7. The handle as claimed in claim 1 comprises:
a second fastener; and
the second attachment arm being terminally attached to the base plate by the second fastener.

8. The handle as in claim 1, wherein the first attachment arm and the second attachment arm being coplanar with each other.

9. A handle accessory comprises:
a handle body;
a base plate;
a precise height measuring gage;
the handle body comprises a gage reading opening, a first attachment arm, a second attachment arm, a curved arm, a gripping arm, and an elongated arm;
the precise height measuring gage further comprises a gage display and a gage body;
the curved arm being terminally connected to the first attachment arm, opposite to the base plate;

the gripping arm being terminally connected to the curved arm, opposite to the first attachment arm;

the elongated arm being terminally connected to the gripping arm, opposite to the curved arm;

the second attachment arm being terminally connected to the elongated arm, opposite to the gripping arm;

the gage display being integrated onto the gage body;

the gage display being oriented toward the first attachment arm through the gage reading opening;

the first attachment arm being terminally attached to the base plate;

the second attachment arm being terminally attached to the base plate, opposite to the first attachment arm; and the precise height measuring gage is positioned between the first attachment arm and the second attachment arm.

10. The handle as claimed in claim 9 comprises:

the curved arm being angularly positioned to the first attachment arm at an obtuse angle;

the gripping arm being linearly positioned to thee curved arm;

the elongated arm being perpendicularly positioned to the gripping arm; and the second attachment arm being perpendicularly positioned to the elongated arm.

11. The handle as claimed in claim 9 comprises:

the gripping arm comprises a base section and a half-cylindrical body;

the base section being terminally connected to the curved arm;

the base section being terminally connected to the elongated arm opposite to the curved arm; and the half-cylindrical body being adjacently connected onto the base section.

12. The handle as in claim 9, wherein the gage reading opening traversing through the curved arm.

13. The handle as claimed in claim 9 comprises:

a first fastener; and the first attachment arm being terminally attached to the base plate by the first fastener.

14. The handle as claimed in claim 9 comprises:

a second fastener; and the second attachment arm being terminally attached to the base plate by the second fastener.

15. The handle as in claim 9, wherein the first attachment arm and the second attachment arm being coplanar with each other.

* * * * *